Oct. 29, 1963   H. H. MERRIMAN   3,108,500
INSERT BUSHING
Filed Dec. 11, 1961

INVENTOR
HENRY H. MERRIMAN

BY *Beaman & Beaman*
ATTORNEY

3,108,500
INSERT BUSHING
Henry H. Merriman, 751 W. Washington St.,
Jackson, Mich.
Filed Dec. 11, 1961, Ser. No. 158,328
4 Claims. (Cl. 77—62)

The invention pertains to a bushing construction, and particularly relates to an insert bushing employable as a drill guide for use in drill jigs and fixtures or the like.

In the machining art it is common to employ bushings of hardened material as guides for drills, reamers, and other rotary cutting tools, in fixtures and jigs for guiding the tool during cutting. In the construction of the fixture a drill bushing of the desired size is very accurately located and means are often provided whereby a bushing may be replaced should it become worn and inaccurate. In that the location of the bushing is usually very accurately determined as the bushing location will determine the location of the hole being drilled, drill bushings are normally manufactured to very close tolerances.

Occasionally, bushing inserts are provided for guiding tools of a lesser dimension than the primary or main bushing, and the invention is directed to a bushing which may be used as an insert for this purpose. An important feature of the invention lies in the employment of deformable protrusions upon the bushing locating surface wherein the insert bushing will accurately center itself within a hole or primary bushing, and wherein accurate grinding or machining of the exterior surface of the bushing is eliminated.

Another object of the invention is to provide a bushing which may be readily employed as an insert whereby the bushing insert will be accurately centered upon being received within a hole even though considerable tolerance, relatively speaking, exists between the hole and the bushing exterior surface.

Another object of the invention is to provide a bushing which may be pressed within a fixture bore and is provided with means to prevent axial movement of the bushing relative to the bore.

Figure 1:
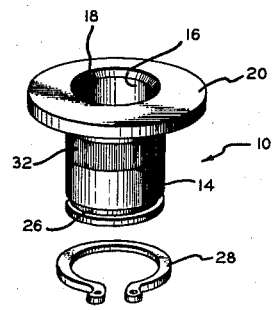
Figure 2:
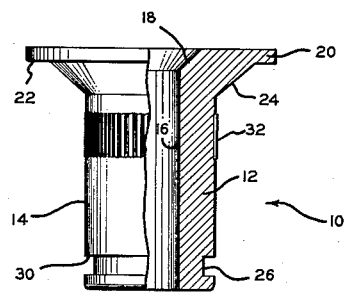
Figure 3:
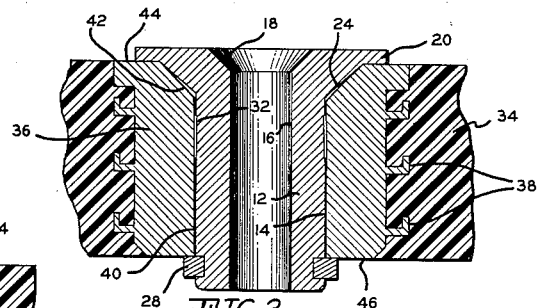
Figure 5:
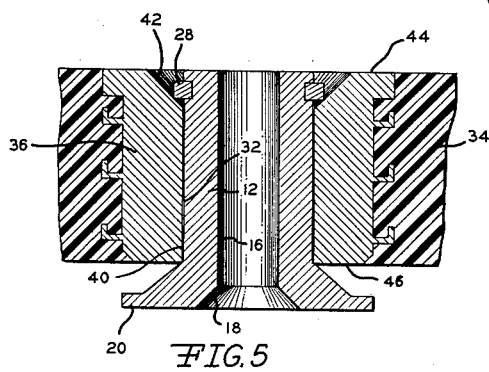
Figure 4:
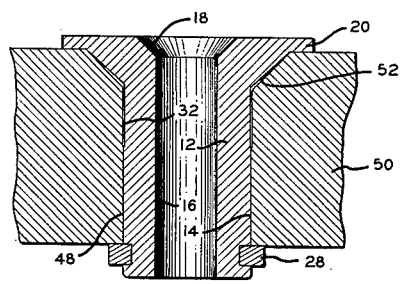

These and other objects of the invention arising from the details of the construction of an embodiment thereof will be apparent from the following description and accompanying drawings wherein:

FIG. 1 is a perspective exploded view of an insert bushing in accord with the invention, and the snap ring employed therewith, FIG. 2 is an enlarged, partially sectioned elevational view of a bushing in accord with the invention, FIG. 3 is an elevational, sectional view of the bushing employed in conjunction with a primary bushing molded into a synthetic fixture, FIG. 4 is an elevational, sectional, view of the bushing of the invention as directly located within the bore of a fixture, and FIG. 5 is an elevational, sectional, view of a variation of assembly of the insert bushing as employed with a bushing identical to that of FIG. 3.

The structural features of an insert bushing in accord with the invention will be appreciated from FIGS. 1 and 2 of the drawings. The bushing 10 includes a cylindrical body 12 having an exterior surface 14. The bushing 10 may be constructed by automatic screw machine processes, is of low cost due to its high production manufacture, and a feature of the invention lies in the fact that the surface 14 may only be a tool machined surface and need not be ground or polished.

An axial drill guide bore 16 extends through the bushing concentric to the outer surface 14 and is usually counterbored at 18 in the upper regions to facilitate entry of the tool. The upper end of the bushing, FIG. 2, is provided with a flange 20 defining a shoulder surface 22 and a conical portion 24 interconnects the flange 20 and cylindrical body portion 12 strengthening the flange. The other end of the bushing is provided with an annular groove 26 for receiving a conventional snap ring 28, and the axial spacing between the inner edge 30 of the groove and the shoulder 22 is predetermined to be slightly greater than the spacing between the surfaces formed upon the primary bushing or fixture defining the thickness thereof.

An annular band of radially extending protrusions 32 is defined upon the bushing surface 14. These protrusions may be formed by any of several methods. However, a preferable construction is provided by use of a knurling tool to form straight knurling consisting of parallel ridges extending in an axial direction whereby the knurl ridges constitute protrusions radially extending beyond the cylindrical surface 14. Forming the protrusions by knurling is particularly advantageous in that the raised ridges will contain minute voids which permit the ridges to deform even though hardened. The ridges or protrusions 32 are formed of the material of the bushing and are relatively small whereby they are deformable in a radial direction, and the degree of radial extension of the outermost portions of the ridges with respect to the surface 14 is only of the order of several thousandths of an inch and is exaggerated in the drawings for purpose of illustration. For instance, in a commercial embodiment of the invention the diameter of the surface 14 is .625 inch and the diameter of the outer portions of the protrusions 32 is .629 inch. Thus, to practice the invention, the knurled protrusions need only extend .001 or .002 of an inch, or even less, from the surface 14.

Referring to FIG. 3, a conventional installation will be described. The fixture or jig 34 employed in the invention may be of a moldable material such as plastic or fiberglass and contain a primary guide bushing 36 molded therein. The bushing 36 illustrated is similar to that shown in my United States application Serial No. 30,259, filed May 19, 1960, although it will be appreciated any conventional bushing may be employed to support the insert bushing of the invention. The bushing 36 is provided with projections 38 for increasing the molded connection of the bushing with the fixture 34, and the bushing 36 is provided with a guide bore 40 having a counterbored portion 42. The axial length of the bushing 36 is defined by an upper surface 44 and a lower surface 46.

The bushing 10 is inserted within the bore 40 of the primary bushing 36 until the shoulder 22 engages the surface 44. At this time the snap ring 28 may be inserted in the groove 26 and due to the location of the groove it will be apparent that the snap ring will engage, or substantially engage, the lower bushing surface 46 to prevent axial movement of the bushing 10 within the bore 40.

Both the bushings 10 and 36 will be of hardened tool steel and the dimension of the surface 14 will be such as to insure reception within the bore 40. Thus, the maximum permissible dimension of cylindrical surface 14 must be slightly less than the minimum permissible diameter of bore 40. This relationship may be assured by maintaining the manufacturing tolerances of the bushings 10 and 36. As the bushing 10 is inserted into the bore 40, the protrusions 32 will engage the wall of the bore 40 and will usually be deformed slightly due to the fact that the maximum diameter of the protrusion band will be a little greater than the diameter of the bore 40. Even though the bushing 10 is hardened the relatively thin protrusions 32 defined on the surface 14 will deform whereby the bushing 10 will be accurately centered within the bore 40.

The amount of deformation of the protrusions 32 on insertion into the bore 40 will depend upon the exact size of the bore 40 and the diameter of the protrusion band. Thus, it will be appreciated that the deformation of the protrusions will usually vary with each bushing combination to the variation in the manufacturing tolerances of the bushings. However, centering of the bushing 10 will be insured due to the protrusions 32 being located about the entire circumference of the surface 14 and their engagement with the bore 40. Under the condition where the bore 40 is of a maximum dimension and the body 12 is of the minimum permissible diameter, little or no protrusion deformation will occur. However, the resulting close fit between bushing bore 40 and the protrusions 32 will achieve the desired centering of bushing 10.

To insure proper assembly of the insert bushing within the bore 40, the conical surface defined upon portion 24 defines a greater included angle than the conical counterbore surface 42 whereby no interference will exist between these surfaces. Also, the axial length of the portion 24 must be less than the axial length of the counterbore 42.

If it is desired to employ the bushing 10 directly with a fixture 50, a bore 48 will be defined within the fixture having a counterbore 52 adapted to accommodate the conical surface 24. The bore 48 may be of a press fit with respect to the surface 14, or as in most cases, the bore will be of only a snug fit with the cylindrical surface 14 and the interconnection between the proptrusions 32 and fixture 50 will be relied upon to prevent rotation of the bushing relative to the fixture. The snap ring 28' is employed as in the above described embodiment to prevent axial movement of the bushing.

In the embodiment of FIG. 4 the protrusions 32 would embed themselves into the bore 48 and act as small broach teeth to cut splines into the bore to accommodate the protrusions. Thus, it will be appreciated that the protrusions 32 will function in the embodiment of FIG. 4 to both insure a centering of the bushing 10 within the bore 48, and also firmly interlock the bushing with respect to the fixture to prevent relative rotation therebetween.

FIG. 5 illustrates a method of assembly between a bushing 36, as shown in FIG. 3, and a bushing 10 in accord with the invention wherein the bushing 10 is inserted in the bore 40 reverse to the relationship as shown in FIG. 3. In this relationship the interference of the conical portion 24 with the surface 46 limits the axial insertion of the body 12 into the bore 40, yet the counterbore 42 permits the snap ring 28 to be located in the groove 26.

However, in that the outer ends of the snap ring will be deformed upwardly due to their greater radial extension as compared to the circumscribing portion of the ring, this mode of assembly produces a high frictional contact between the bushings 10 and 36 restraining rotation therebetween should the tolerances between body 12 and bore 40 be such that the protrusions 32 did not restrain rotation if rotation of bushing 18 is objectionable. Of course, the assembled relation of FIG. 3 is preferred, and the assembly of FIG. 5 would only be employed under unusual conditions.

It will be appreciated that the invention permits a low cost insert bushing to be accurately centered within a hole or primary bushing without necessitating expensive grinding and machining operations. It has been found that by employing a straight knurl to form the protrusions 32 that accuracy is obtainable permissible within the tolerances of most drilling operations, and that the ease of assembly of the bushing with a primary bushing greatly facilitates the interchanging of bushings for different drill or reamer sizes, and permits ready replacement of the bushings. The snap ring locking action provides a positive locking of the bushing in place and accidental disassembly of the bushing from its supporting bore is prevented.

It is appreciated that various embodiments of the invention may be apparent to those skilled in the art without departing from the spirit and scope thereof, and it is intended that the invention be defined only by the following claims.

I claim:

1. In combination, a hardened bushing having a cylindrical bushing bore, a bushing insert mounted within said cylindrical bushing bore, said bushing having a pair of axially spaced surfaces defined thereon transversely intersecting and defining the length of said bushing bore, said bushing insert including a body member having an exterior cylindrical surface and a coaxial guide bore defined therethrough, said body member surface being slightly less in diameter than said bushing bore, a plurality of radially extending deformable protrusions defined on said body member and extending from said cylindrical surface uniformaly disposed about the periphery thereof for engaging said cylindrical bushing bore and centering said body member within said bushing bore, a radially extending shoulder defined on said body member radially projecting beyond said cylindrical surface for engagement with a bushing transverse surface upon said bushing insert being completely received within the bushing bore and an annular snap ring receiving groove defined in said body member axially spaced from said shoulder and a snap ring within said groove engaging the other bushing transverse surface.

2. In a combination, as in claim 1, said shoulder being defined adjacent one end of said body member, said groove being defined adjacent the other end, and said protrusions constitute a band of parallel axially extending ridges defined about said body member surface.

3. In combination, a hardened bushing having a cylindrical bushing bore, a bushing insert mounted within said cylindrical bushing bore, said bushing bore being sized to given tolerances, said bushing insert being characterized by its ability to be accurately centered within said bushing bore without employing precision machined guide surfaces and including, a body member having an exterior cylindrical surface and a coaxial guide bore defined therethough, said body member surface being of a maximum diameter slightly less than the minimum tolerable diameter of said bushing bore, a plurality of radially extending deformable protrusions defined on said body member and extending from said cylindrical surface uniformly disposed about the periphery thereof for engaging said bushing bore and centering said body member within said bushing bore, said protrusions defining a maximum diameter at least equal to the maximum tolerable diameter of said bushing bore and deforming toward said body member cylindrical surface upon said bushing bore diameter being less than the diameter defined by said protrusions.

4. In a combination as in claim 3, wherein said body member includes first and second ends, a radially extending shoulder defined on said body member at said first end and a groove defined in said body member cylindrical surface adjacent said second end adapted to receive a snap ring, said protrusions being in the form of a knurled band axially spaced from said groove.

References Cited in the file of this patent

UNITED STATES PATENTS 1,292,620     Luers _____ Jan. 28, 1919

FOREIGN PATENTS 572,034     Canada _____ Mar. 10, 1959